UNITED STATES PATENT OFFICE.

ALFRED PARAF, OF NEW YORK, N. Y., ASSIGNOR TO EDWARD SABINE RENWICK, TRUSTEE, OF SAME PLACE.

IMPROVEMENT IN PROCESSES OF EXTRACTING THE COLORING MATTER OF MADDER.

Specification forming part of Letters Patent No. 110,995, dated January 17, 1871.

*To all whom it may concern:*

Be it known that I, ALFRED PARAF, of France, now residing in the city, county, and State of New York, have made an invention or discovery of a new and useful Process of Extracting the Coloring Matter of Madder by means of Liquid Hydrocarbons; and that the following is a full, clear, and exact description and specification of the same.

It has long been known that the coloring matter of madder may be extracted by treating flour of madder or garancine with a hydrocarbon solvent, such, for example, as ether or schiste oil; but the process adopted has not, previous to the present invention, resulted in the production of a material that could be used practically for the purpose of printing and dyeing fabrics. I have discovered, however, that when garancine is subjected to the action of boiling kerosene in an open vessel, and the coloring matter thereby extracted is transferred to a solution of a caustic alkali, and is precipitated by an acid, an extract is produced which may be immediately used with success for dyeing and printing madder colors.

The kerosene employed may be combined with paraffine or with other materials that raise its boiling-point without injuring the effect upon the garancine or the product thereof, or the kerosene may be used alone. In case paraffine be employed it may be combined with the kerosene in the proportions of one part, by weight, of paraffine to two parts, by weight, of kerosene.

The dry garancine may be boiled with the kerosene (either alone or combined with paraffine) in an open vessel, in the proportions of one part, by weight, of garancine to six parts, by weight, of the solvent liquid, for three-quarters of an hour, the material being constantly stirred during the operation. The product may then be filtered to separate the liquid; but the better plan is to permit the product to settle, and to dip out the liquid portion from the vessel. The material in the vessel is then boiled a second time for half an hour with a quantity of the solvent liquid equal to the first. The product is permitted to settle, and the liquid portion is either separated by filtration or dipped out, as before. The material in the vessel is then boiled a third time with the same quantity of the solvent liquid as before. The product is permitted to settle, and the liquid portion is either separated by filtration or dipped out of the vessel. The residuum remaining is placed in bags, and is pressed so as to free it as thoroughly as possible from the kerosene solution.

The liquid obtained by the preceding operations is a fluid extract of the coloring matter of madder, which appears to be combined with the oleaginous matter of the kerosene, and which is treated as follows: Place the liquid in a vat or in barrels, which should not be filled quite half-full. Add an equal quantity of boiling water, and for each one hundred gallons of the mixture of the water and the liquid add one quart of an aqueous solution of caustic soda at 6° Baumé. Stir the mixture and permit it to settle for one hour.

By these operations the coloring matter is transferred from the kerosene to the alkaline aqueous solution, leaving the kerosene practically colorless floating on the surface of the aqueous solution. The latter is then separated from the kerosene by drawing it off, or by decanting the kerosene. The kerosene may then be used again for treating a new quantity of garancine.

The aqueous solution is treated with an acid that will combine with the soda and cause the precipitation of the coloring matter. The acid preferred for this purpose is muriatic acid, which is stirred into the aqueous solution drop by drop until no further precipitation ensues. The precipitate is then separated from the liquid by means of a cloth filter. The precipitate thus obtained is of a deep orange-red color, and may be used at once in the moist state for printing cloths, or it may be previously dried by exposure to air, with or without the aid of heat. It appears to be a new solid compound extract of the coloring matter of the madder plant and the oily matter derived from the solvent, and is especially valuable for printing fabrics with madder colors.

Instead of employing paraffine as the auxiliary agent for raising the boiling-point of the hydrocarbon solvent, an equal quantity of glycerine may be used for the same purpose, and the process may be practiced in the same manner. In this case the glycerine does not appear to be dissolved in the hydrocarbon solvent, but to produce an emulsion which has a much higher boiling-point than the hydrocarbon, so that the temperature may be raised and the volatilization of the solvent is impeded.

The process thus described is not restricted to the use of paraffine and glycerine, as kerosene freed from the lighter oils, such as naphtha, may be used with advantage without the addition of paraffine or glycerine. If naphtha or other light oils be present, they are driven off by the boiling, and the use of kerosene or refined petroleum containing a considerable quantity of such lighter oils is not economical.

The temperature at which the solution of the coloring matter takes place varies according to the nature of the solvent liquid. Excellent results have been obtained with a mixture of light kerosene and paraffine at a temperature of 270° Fahrenheit, and with a pure but denser kerosene at a temperature of 340°.

In place of using garancine, either ground madder or flour of madder may be used as the madder material to be treated by the process; but when either of these materials is used, it is expedient to render it acid before treating it with the kerosene by thoroughly mixing the material with about one-tenth of one per cent. of muriatic acid.

I claim as the invention to be secured by Letters Patent—

The improved process of extracting the coloring matter of madder by means of a liquid hydrocarbon, substantially as before set forth.

In testimony whereof I have hereto set my hand this 13th day of December, 1869.

ALFRED PARAF.

Witnesses:
E. S. RENWICK,
W. L. BENNEM.